US011476741B2

(12) United States Patent
Hattori

(10) Patent No.: US 11,476,741 B2
(45) Date of Patent: Oct. 18, 2022

(54) ROTARY ELECTRIC MACHINE

(71) Applicant: TOYOTA JIDOSHA KABUSHIKI KAISHA, Toyota (JP)

(72) Inventor: Hiroyuki Hattori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 17/073,845

(22) Filed: Oct. 19, 2020

(65) Prior Publication Data

US 2021/0143714 A1 May 13, 2021

(30) Foreign Application Priority Data

Nov. 11, 2019 (JP) ............................. JP2019-204006

(51) Int. Cl.

*H02K 16/02* (2006.01)
*H02K 21/04* (2006.01)
*H02K 1/276* (2022.01)

(52) U.S. Cl.

CPC ............. *H02K 16/02* (2013.01); *H02K 1/276* (2013.01); *H02K 21/046* (2013.01)

(58) Field of Classification Search

CPC ........ H02K 16/02; H02K 1/146; H02K 1/276; H02K 21/046; H02K 2201/06

See application file for complete search history.

(56) References Cited

U.S. PATENT DOCUMENTS

| | | | | | |
|---|---|---|---|---|---|
| 4,559,463 | A * | 12/1985 | Kobayashi | H02K 1/276 | 310/156.56 |
| 4,656,379 | A * | 4/1987 | McCarty | H02K 21/046 | 310/156.28 |
| 5,731,647 | A * | 3/1998 | Schuller | H02K 21/046 | 310/156.53 |
| 6,972,504 | B1 * | 12/2005 | Hsu | H02K 21/046 | 310/191 |
| 7,129,611 | B2 * | 10/2006 | Hsu | H02K 21/046 | 310/191 |
| 7,969,056 | B2 * | 6/2011 | Mizutani | H02K 21/046 | 310/181 |

(Continued)

FOREIGN PATENT DOCUMENTS

| | | |
|---|---|---|
| JP | 2008-187826 A | 8/2008 |
| JP | 2010-068598 A | 3/2010 |

(Continued)

*Primary Examiner* — Dang D Le
(74) *Attorney, Agent, or Firm* — Oliff PLC

(57) ABSTRACT

A rotary electric machine includes: a rotary shaft member; first and second rotor including first and second rotor core, respectively, including first and second permanent magnets having first and second polarity, first and second magnet-based magnetic pole portions having the first and the second polarities and being formed by the first and the second permanent magnets, and first and second iron core portions having the second and the first polarities and being formed by iron pole portions of the first and the second rotor core, are alternately arranged in a circumferential direction of the first rotor core; a stator; and a field yoke. Further, the first magnet-based magnetic pole portion and the second iron pole portion face each other and the first iron pole portion and the second magnet-based magnetic pole portion face each other in the axial direction.

4 Claims, 12 Drawing Sheets

(56) References Cited

U.S. PATENT DOCUMENTS

| | | | | |
|---|---|---|---|---|
| 9,083,225 | B2 * | 7/2015 | Tonogi .................. | H02K 1/148 |
| 2010/0019606 | A1 | 1/2010 | Mizutani et al. | |

FOREIGN PATENT DOCUMENTS

| | | | |
|---|---|---|---|
| JP | 5159228 | B2 | 3/2013 |
| JP | 5388678 | B2 | 1/2014 |
| JP | 2016-149895 | A | 8/2016 |
| JP | 2017-099046 | A | 6/2017 |
| JP | 2018-085799 | A | 5/2018 |

* cited by examiner

ROTARY ELECTRIC MACHINE

CROSS-REFERENCE TO RELATED APPLICATION(S)

The present application claims priority to and incorporates by reference the entire contents of Japanese Patent Application No. 2019-204006 filed in Japan on Nov. 11, 2019.

BACKGROUND

The present disclosure relates to a rotary electric machine.

Japanese Laid-open Patent Publication No. 2010-068598 discloses a rotary electric machine including: a rotor provided in a shaft and having an annular rotor core including a plurality of embedded permanent magnets; a stator having an annular stator core and a stator coil, the stator core being arranged at intervals in a radial direction with respect to the rotor core; and a field yoke disposed outside the rotor and the stator in the axial direction and provided with a field coil. The rotor is a consequent pole type rotor in which a magnet-based magnetic pole portion having an N-pole with a permanent magnet and an iron pole portion having an S-pole with an iron core of the rotor core without a permanent magnet are formed alternately in the circumferential direction of the rotor core.

SUMMARY

There is a need for providing a rotary electric machine capable of reducing vibration during rotor rotation due to non-uniformity in the magnetic flux.

According to an embodiment, a rotary electric machine includes: a rotary shaft member rotatable about an axis; a first rotor including a first rotor core having an annular shape secured to the rotary shaft member, a plurality of first permanent magnets having a first polarity being embedded in the first rotor core, the first rotor having a configuration in which a first magnet-based magnetic pole portion having the first polarity and formed by the first permanent magnets, and a first iron core portion having a second polarity different from the first polarity and formed by an iron pole portion of the first rotor core without having the first permanent magnet, are alternately arranged in a circumferential direction of the first rotor core; a second rotor including a second rotor core having an annular shape secured to the rotary shaft member, a plurality of second permanent magnets having the second polarity being embedded in the second rotor core, the second rotor having a configuration in which a second magnet-based magnetic pole portion having the second polarity and formed by the second permanent magnets, and a second iron core portion having the first polarity and formed by an iron pole portion of the second rotor core without having the second permanent magnet, are alternately arranged in a circumferential direction of the second rotor core; a stator including a stator core having an annular shape arranged at an interval in a radial direction orthogonal to an axial direction of the rotary shaft member and including a stator coil provided in the stator core, provided with respect to the first rotor and the second rotor; and a field yoke arranged outside of the first rotor, the second rotor, and the stator, in the axial direction, and including a field coil that is energized to generate a field-based magnetic flux. Further, the first rotor and the second rotor are arranged on the rotary shaft member, in a state where the first magnet-based magnetic pole portion and the second iron pole portion face each other while the first iron pole portion and the second magnet-based magnetic pole portion face each other in the axial direction.

DETAILED DESCRIPTION

In the related art, the consequent pole type rotor can reduce the number of permanent magnets compared to the rotor in which permanent magnets having N-poles and permanent magnets having S-poles are alternately arranged in the circumferential direction of the rotor core, leading to achievement of cost reduction.

However, the magnet-based magnetic pole portion where the permanent magnet is disposed has high magnetic flux directionality and density, whereas the iron pole portion with no permanent magnet has low magnetic flux directionality and density. In the rotor of the rotary electric machine disclosed in Japanese Laid-open Patent Publication No. 2010-068598, the magnet-based magnetic pole portion and the iron pole portion are alternately arranged in the circumferential direction of the rotor core. Accordingly, the directionality and density of the magnetic flux on the rotor surface, in other words, the magnetic flux distribution and the magnetic flux amount are not uniform, leading to non-uniformity of the magnetic flux applied from the rotor to the stator. This non-uniformity of the magnetic flux will increase the vibration during the rotation of the rotor.

First Embodiment

Hereinafter, a first embodiment of a rotary electric machine according to the present disclosure will be described. Note that the present disclosure is not limited by the present embodiment.

Figure 1:
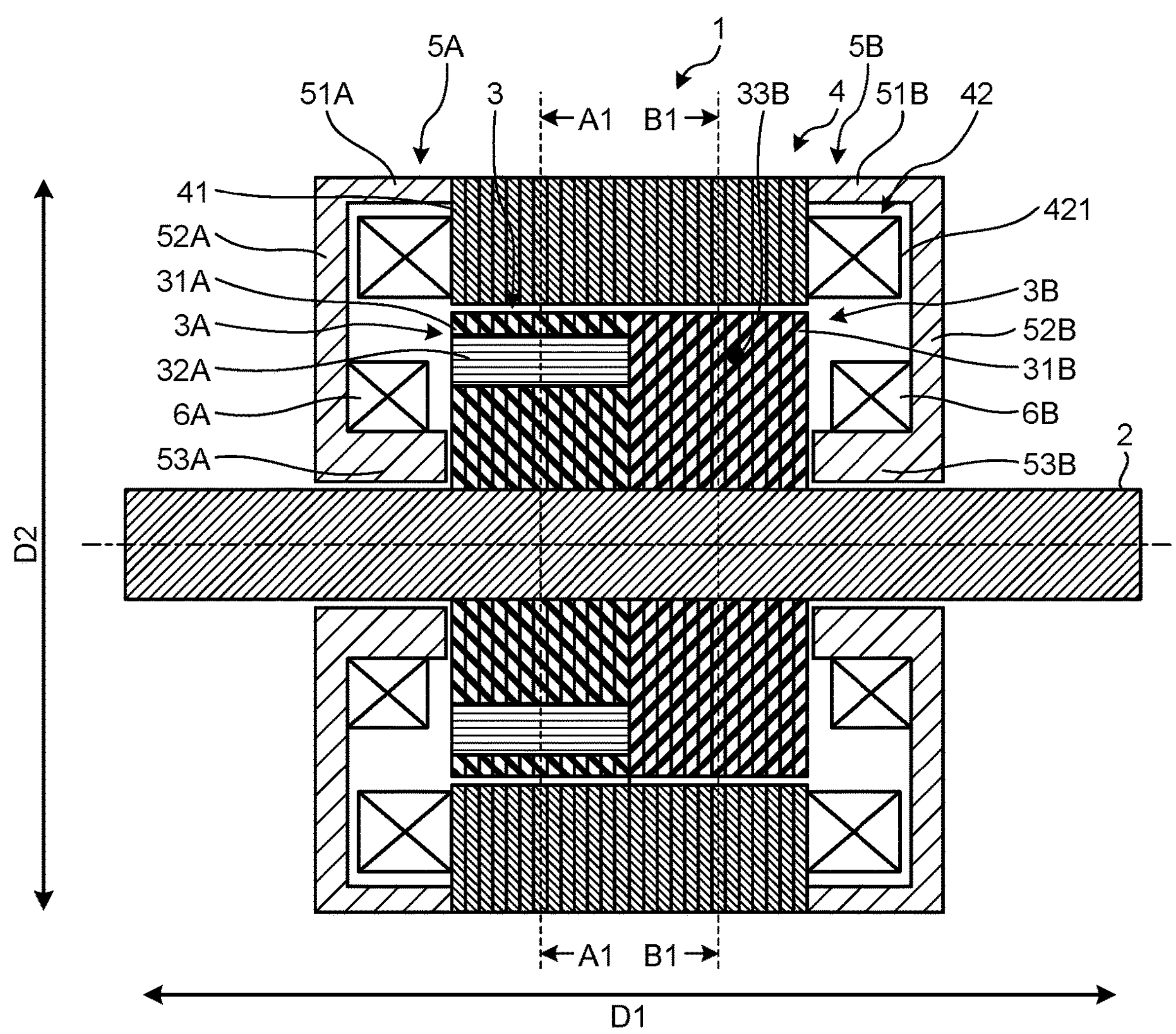
FIG. 1 is a cross-sectional view of a rotary electric machine according to a first embodiment, as viewed in a direction orthogonal to an axial direction.
Figure 2:
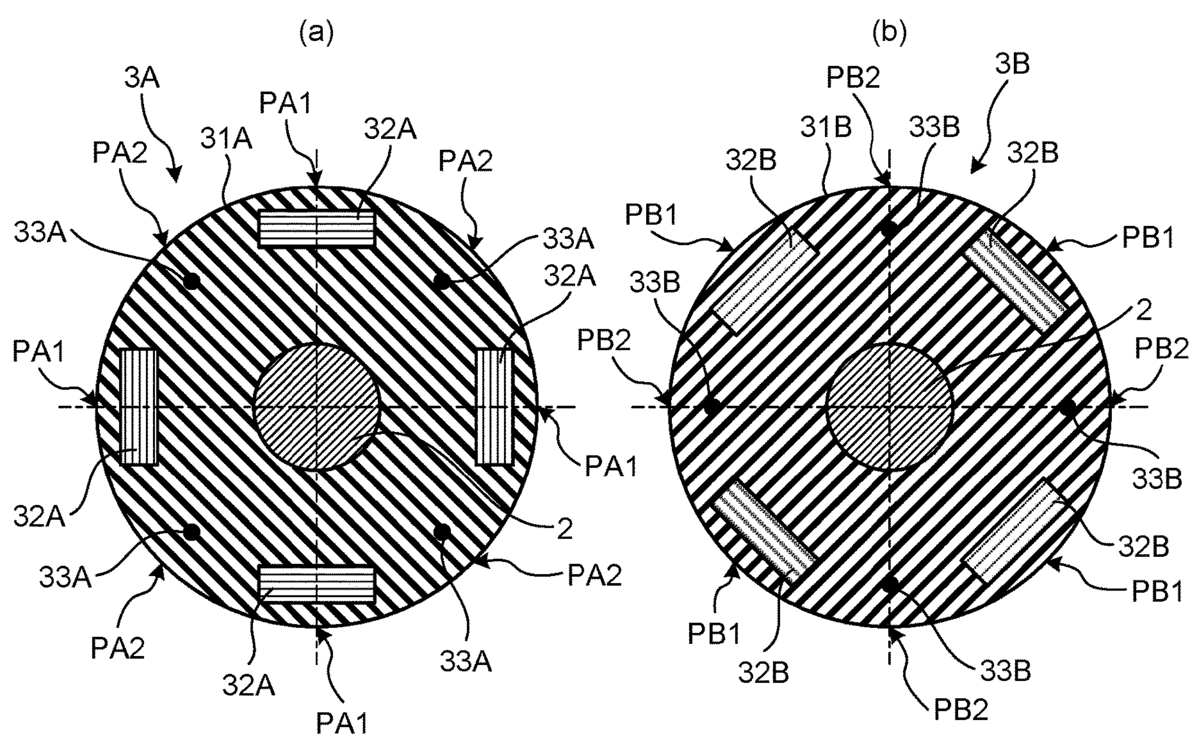
FIG. 2 includes a cross-sectional view of a first rotor taken along line A1-A1 in FIG. 1 and a cross-sectional view of a second rotor taken along line B1-B1 in FIG. 1.

FIG. 1 is a cross-sectional view of a rotary electric machine 1 according to the first embodiment, as viewed in a direction orthogonal to an axial direction D1. Part (a) of FIG. 2 is a cross-sectional view of a first rotor taken along line A1-A1 in FIG. 1. Part (b) of FIG. 2 is a cross-sectional view of a second rotor taken along line B1-B1 in FIG. 1.

As illustrated in FIG. 1, the rotary electric machine 1 according to the first embodiment includes a shaft 2, a rotor 3, a stator 4, a first field yoke 5A, a second field yoke 5B, a first field coil 6A, and a second field coil 6B, or the like, and functions as at least one of an electric motor or a generator in application.

The shaft 2 is a metal rotary shaft member that is long in the axial direction D1 and that is rotatable about the axis. Note that the "axial direction D1" in the following descriptions is defined to be the axial direction (longitudinal direction) of the shaft 2.

The rotor 3 includes a first rotor 3A and a second rotor 3B that are arranged on a same axis to be in contact with each other in the axial direction D1.

The first rotor 3A includes a first rotor core 31A, a first permanent magnet 32A or the like.

The first rotor core 31A is formed in an annular shape using a plurality of electromagnetic steel plates stacked in the axial direction D1 and is directly secured to the shaft 2 so as to be rotatable together with the shaft 2. In the first rotor core 31A, there is a gap between the electromagnetic steel plates in the axial direction D1, and therefore, the magnetoresistance in the axial direction D1 is higher than the magnetoresistance in a radial direction D2 being a direction orthogonal to the axial direction D1 of the rotor 3 and than the magnetoresistance in the circumferential direction of the rotor 3. Therefore, in the first rotor core 31A, a magnetic flux is not allowed to flow easily in the axial direction D1, while the magnetic flux easily flows in the radial direction D2 and the circumferential direction.

The first permanent magnet 32A is embedded in the first rotor core 31A and extends in the axial direction D1 of the first rotor core 31A. Both end surfaces of the first permanent magnet 32A in the axial direction D1 are substantially flush with both end surfaces of the first rotor core 31A in the axial direction D1. Furthermore, as illustrated in part (a) of FIG. 2, the first permanent magnet 32A has a rectangular shape in a cross section orthogonal to the axial direction D1 and is disposed so that an outer magnetic pole surface in the radial direction D2 indicates an N-pole, that is, the first polarity. In addition, four first permanent magnets 32A are separately arranged concentrically in the outer region in the radial direction D2 inside the first rotor core 31A with an interval of a mechanical angle of 90 degrees in the circumferential direction. Examples of the first permanent magnet 32A include a rare earth magnet or a ferrite magnet.

The first rotor 3A has four first magnet-based magnetic pole portions PA1 and four first iron pole portions PA2. The four first magnet-based magnetic pole portions PA1 are magnet-based magnetic pole portions separately arranged on the first rotor core 31A at equal intervals in the circumferential direction, each of which having one first permanent magnet 32A, having N-polarity being the first polarity attributed to the first permanent magnet 32A. The four first iron pole portions PA2 are iron pole portions individually formed between the adjacent first permanent magnets 32A on the first rotor core 31A, by using an iron core 33A of the first rotor core 31A without using permanent magnets, having an S-pole indicating a second polarity different from the first polarity.

In this manner, the first rotor 3A has a consequent pole structure in which the magnetic pole portion having the N-pole (first magnet-based magnetic pole portion PA1) and the magnetic pole portion having the S-pole (first iron pole portion PA2) are alternately arranged in the circumferential direction.

The second rotor 3B includes a second rotor core 31B and a second permanent magnet 32B.

The second rotor core 31B is formed in an annular shape using a plurality of electromagnetic steel plates stacked in the axial direction D1 and is directly secured to the shaft 2 so as to be rotatable together with the shaft 2. The second rotor core 31B has same inner diameter, outer diameter, and length in the axial direction D1 as those of the first rotor core 31A. In the second rotor core 31B, there is a gap between the electromagnetic steel plates in the axial direction D1, and therefore, the magnetoresistance in the axial direction D1 is higher than the magnetoresistance in a radial direction D2 being a direction orthogonal to the axial direction D1 of the rotor 3 and than the magnetoresistance in the circumferential direction of the rotor 3. Therefore, in the second rotor core 31B, a magnetic flux is not allowed to flow easily in the axial direction D1, while the magnetic flux easily flows in the radial direction D2 and the circumferential direction.

The second permanent magnet 32B is embedded in the second rotor core 31B and extends in the axial direction D1 of the second rotor core 31B. Both end surfaces of the second permanent magnet 32B in the axial direction D1 are substantially flush with both end surfaces of the second rotor core 31B in the axial direction D1. Furthermore, as illustrated in part (b) of FIG. 2, the second permanent magnet 32B has a rectangular shape in a cross section orthogonal to the axial direction D1 and is disposed so that an outer magnetic pole surface in the radial direction D2 indicates an S-pole as the second polarity. In addition, four second permanent magnets 32B are separately arranged concentrically in the outer region in the radial direction D2 inside the second rotor core 31B with an interval of a mechanical angle of 90 degrees in the circumferential direction. Examples of the second permanent magnet 32B include a rare earth magnet or a ferrite magnet.

The second rotor 3B has four second magnet-based magnetic pole portions PB1 and four second iron pole portions PB2. The four second magnet-based magnetic pole portions PB1 are magnet-based magnetic pole portions separately arranged on the second rotor core 31B at equal intervals in the circumferential direction, each of which having one second permanent magnet 32B, having S-polarity being the second polarity attributed to the second permanent magnet 32B. The four second iron pole portions PB2 are iron pole portions individually formed between the adjacent second permanent magnets 32B on the second rotor core 31B, by using an iron core 33B of the second rotor core 31B without using permanent magnets, having an N-pole indicating the first polarity.

In this manner, the second rotor 3B has a consequent pole structure in which the magnetic pole portion having the S-pole (second magnet-based magnetic pole portion PB1) and the magnetic pole portion having the N-pole (second iron pole portion PB2) are alternately arranged in the circumferential direction.

In addition, the first rotor 3A and the second rotor 3B are arranged on the shaft 2 so that the first magnet-based magnetic pole portion PA1 and the second magnet-based magnetic pole portion PB1, and the first iron pole portion PA2 and the second iron pole portion PB2, each have a positional relationship in which the mechanical angle is shifted by 45 degrees in the circumferential direction. That is, the first rotor core 31A and the second rotor core 31B are arranged on the shaft 2 so that the first magnet-based magnetic pole portion PA1 of the first rotor 3A and the second iron pole portion PB2 of the second rotor 3B face each other, and the first iron pole portion PA2 of the first rotor 3A and the second magnet-based magnetic pole portion PB1 of the second rotor 3B face each other in the axial direction D1. In this manner, the positions of the magnet-based magnetic pole portions in the rotor 3 are different in the circumferential direction between the first rotor 3A side which is one side of the axial direction D1 and the second rotor 3B side which is the other side of the axial direction D1 with the center of the axial direction D1 as a boundary.

Furthermore, the first rotor 3A and the second rotor 3B are arranged on the shaft 2 with the first rotor core 31A and the second rotor core 31B coming in contact with each other in the axial direction D1. This makes it possible to reduce the size of the rotary electric machine 1 in the axial direction D1 as compared with a case where the first rotor 3A and the second rotor 3B are separated from each other in the axial direction D1.

In the rotor 3 according to the first embodiment, the first magnet-based magnetic pole portion PA1 in the first rotor 3A has a polarity of the N-pole, the first iron pole portion PA2 has a polarity of the S-pole, the second magnet-based magnetic pole portion PB1 in the second rotor 3B has a polarity of the S-pole, and the second iron pole portion PB2 has a polarity of the N-pole. However, the polarity arrangement is not limited to this pattern. For example, the first magnet-based magnetic pole portion PA1 in the first rotor 3A may have a polarity of the S-pole, the first iron pole portion PA2 may have a polarity of the N-pole, the second magnet-based magnetic pole portion PB1 in the second rotor 3B may have a polarity of the S-pole, and the second iron pole portion PB2 may have a polarity of the S-pole.

Furthermore, while the first rotor 3A and the second rotor 3B according to the first embodiment respectively include four first magnet-based magnetic pole portions PA1 and four second magnet-based magnetic pole portions PB1, four first iron pole portions PA2 and four second iron pole portions PB2, the present disclosure is not limited to these numbers. For example, the first rotor 3A and the second rotor 3B according to the first embodiment may respectively include three (or five) first magnet-based magnetic pole portions PA1 and three (or five) second magnet-based magnetic pole portions PB1, three (or five) first iron pole portions PA2 and three (or five) second iron pole portions PB2.

The stator 4 includes: a cylindrical stator core 41 disposed outward at a predetermined interval in the radial direction D2 of the rotor 3; and a stator coil 42 wound around the stator core 41. The stator core 41 is formed by using a plurality of electromagnetic steel plates stacked in the axial direction D1. In the stator core 41, there is a gap between the electromagnetic steel plates in the axial direction D1, and therefore, the magnetoresistance in the axial direction D1 is higher than the magnetoresistance in the radial direction D2 and in the circumferential direction. Therefore, in the stator core 41, the magnetic flux is not allowed to flow easily in the axial direction D1, while the magnetic flux easily flows in the radial direction D2 and the circumferential direction.

The first field yoke 5A and the second field yoke 5B are formed of a magnetic material, and as illustrated in FIG. 1, each of which respectively includes a first outer wall 51A and a second outer wall 51B, a first end wall 52A and a second end wall 52B, and a first inner wall 53A and a second inner wall 53B, and are arranged outside in the axial direction D1 of the rotor 3 and the stator 4. The first outer wall 51A and the second outer wall 51B extend from outer peripheral edges of the first end wall 52A and the second end wall 52B respectively in the radial direction D2 to the stator core 41 side in the axial direction D1. In addition, the inner end surfaces of the first outer wall 51A and the second outer wall 51B in the axial direction D1 face both ends of the stator core 41 in the axial direction D1. The first end wall 52A and the second end wall 52B extend in the radial direction D2 and are individually located at positions on the rotor 3 and the stator 4 apart from both ends of the coil ends 421 in the axial direction D1. The first inner wall 53A and the second inner wall 53B extend in the axial direction D1 so as to be continuous to the inner peripheral edge of the first end wall 52A and the second end wall 52B respectively in the radial direction D2 and are arranged at predetermined intervals from both ends of the rotor 3 in the axial direction D1. In addition, the first inner wall 53A and the second inner wall 53B are arranged at predetermined intervals from the shaft 2 in the radial direction D2.

The first field coil 6A and the second field coil 6B energized to generate field-based magnetic flux are respectively provided on the rotor 3 side surface of the first end wall 52A and the second end wall 52B in the axial direction D1.

In the rotary electric machine 1 according to the first embodiment, it is possible to execute, for example, by using a control device provided in a vehicle in which the rotary electric machine 1 is mounted, a low load mode to be performed when the load of the rotary electric machine 1 is low and a high load mode to be performed when the load of the rotary electric machine 1 is high. The low load mode is a mode that is executed when the rotary electric machine 1 rotates at a high speed (when the torque load is low) or when there is no load, and in which no energization is performed to the first field coil 6A or the second field coil 6B. The high load mode is a mode that is executed when the rotary electric machine 1 has a high load and energizes the first field coil 6A and the second field coil 6B.

Figure 3:
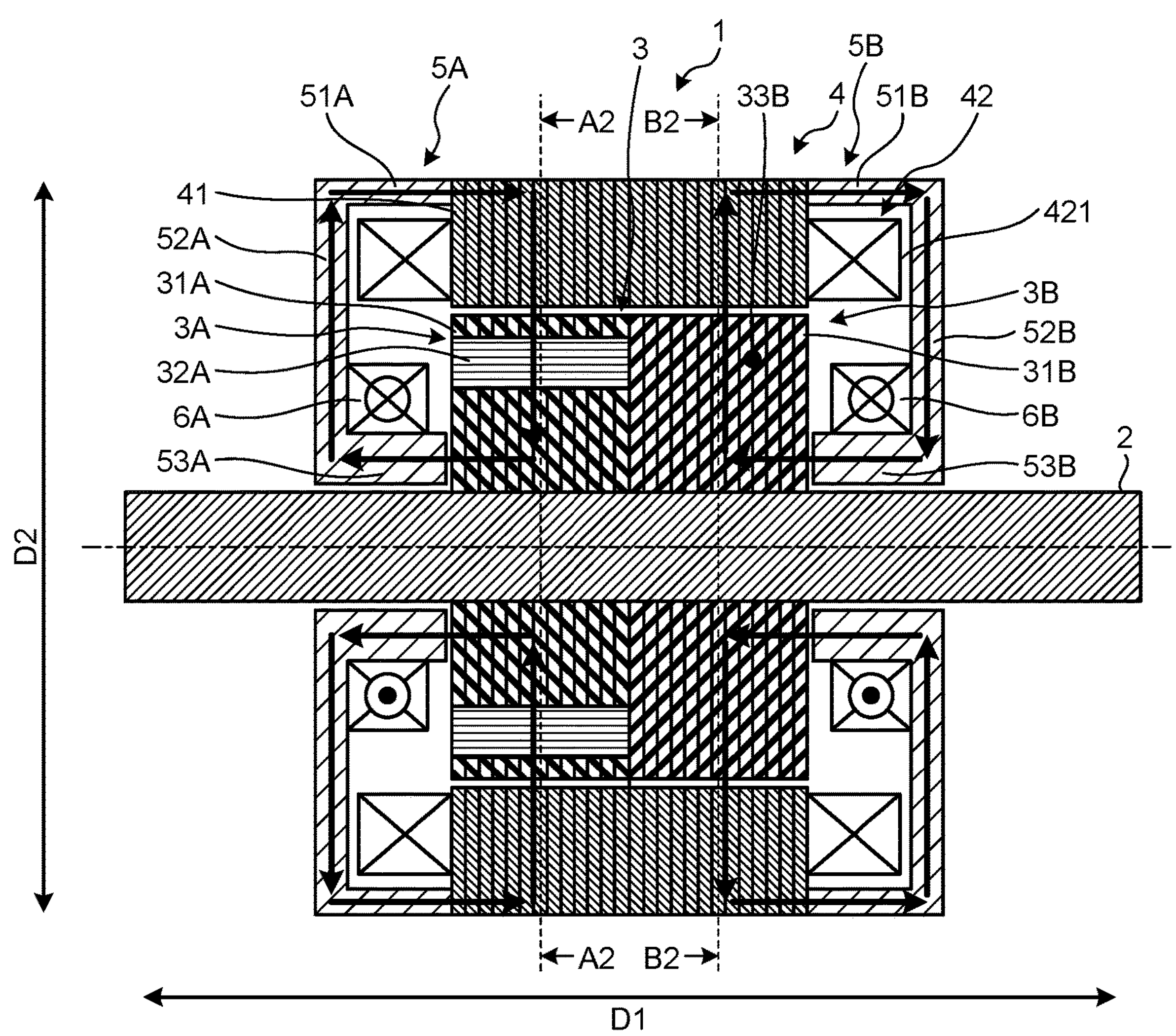
FIG. 3 is a cross-sectional view illustrating a flow of a field-based magnetic flux when the rotary electric machine according to the first embodiment is viewed in a direction orthogonal to the axial direction.

FIG. 3 is a cross-sectional view illustrating flows of field-based magnetic fluxes MF1A and MF1B, as viewed in the direction orthogonal to the axial direction D1 of the rotary electric machine 1 according to the first embodiment. Note that, in FIG. 3, the flows of the field-based magnetic fluxes MF1A and MF1B are illustrated by solid arrows. Furthermore, in the first field coil 6A and the second field coil 6B illustrated in FIG. 3, the symbol having a black spot (•) inside an open circle (○) indicates a flow of field current through the conductors forming the first field coil 6A and the second field coil 6B, from the back side to the front side of the page. In addition, the symbol having mark (x) inside an open circle (○) indicates a flow of the field current through the conductors forming the first field coil 6A and the second field coil 6B, from the front side to the back side of the page. In FIG. 3, the field current flows in the same direction in the first field coil 6A and the second field coil 6B.

As illustrated in FIG. 3, energization of the first field coil 6A leads to formation of a magnetic circuit in which the field-based magnetic flux MF1A flows, when the first inner wall 53A of the first field yoke 5A is defined as a starting point, through the first inner wall 53A, the first end wall 52A, the first outer wall 51A, the stator core 41, and the first rotor core 31A in this order. That is, the first field coil 6A is energized to form a magnetic circuit connecting through the first field yoke 5A, the first rotor 3A, and the stator 4. Furthermore, the amount of magnetic flux between the first rotor 3A and the stator 4 can be controlled by adjusting the amount of current flowing through the first field coil 6A.

In addition, as illustrated in FIG. 3, energization of the second field coil 6B leads to formation of a magnetic circuit in which the field-based magnetic flux MF1B flows, when the second inner wall 53B of the second field yoke 5B is defined as a starting point, through the second inner wall 53B, the second rotor core 31B, the stator core 41, the second outer wall 51B, and the second end wall 52B in this order. That is, the energized second field coil 6B forms a magnetic circuit connecting through the second field yoke 5B, the second rotor 3B, and the stator 4. Furthermore, the amount of magnetic flux between the second rotor 3B and the stator 4 can be controlled by adjusting the amount of current flowing through the second field coil 6B.

Figure 4:
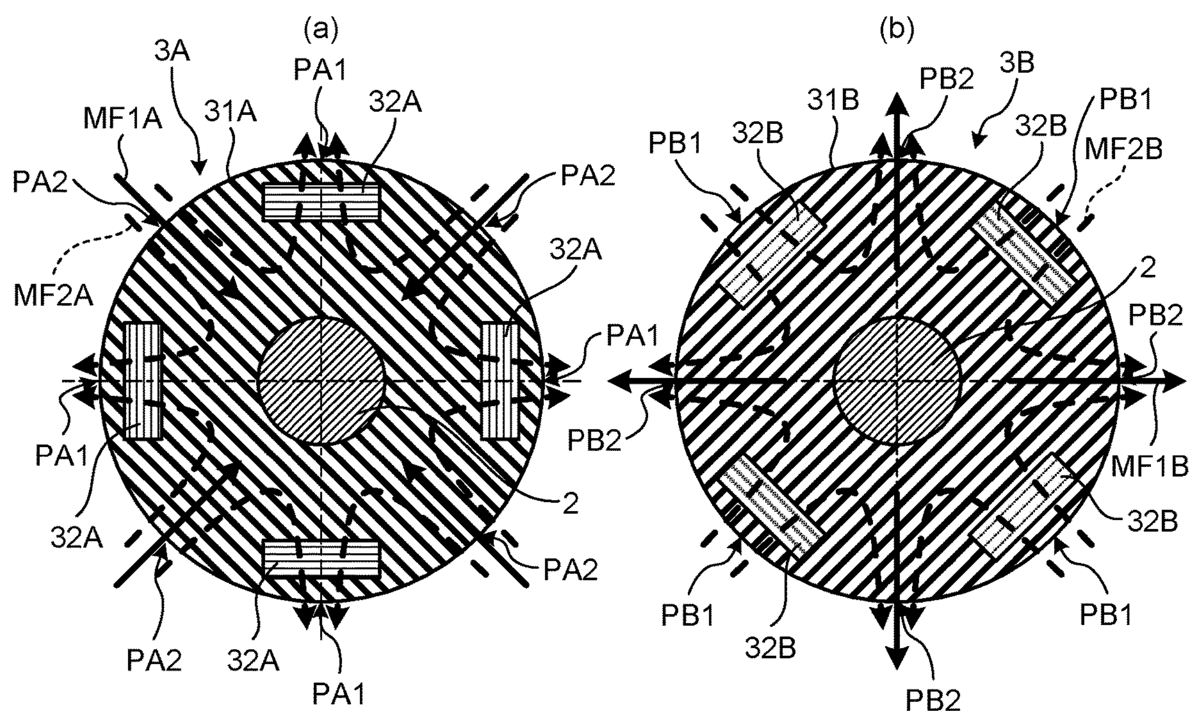
FIG. 4 includes a cross-sectional view of the first rotor taken along line A2-A2 in FIG. 3 and a cross-sectional view of the second rotor taken along line B2-B2 in FIG. 3.

Part (a) of FIG. 4 is a cross-sectional view of the first rotor 3A taken along line A2-A2 in FIG. 3. Part (b) of FIG. 4 is a cross-sectional view of the second rotor 3B taken along line B2-B2 in FIG. 3. In addition, in parts (a) and (b) of FIG. 4, the flows of the field-based magnetic fluxes MF1A and MF1B are indicated by solid arrows. In addition, in parts (a) and (b) of FIG. 4, the flows of magnet-based magnetic fluxes MF2A and MF2B are indicated by dashed arrows.

As illustrated in part (a) of FIG. 4, in the first magnet-based magnetic pole portion PA1 of the N-pole in the first rotor 3A, the magnet-based magnetic flux MF2A generated by the first permanent magnet 32A flows out from the first magnet-based magnetic pole portion PA1 outward in the radial direction. Furthermore, as illustrated in part (b) of FIG. 4, in the second iron pole portion PB2 of the N-pole in the second rotor 3B, the field-based magnetic flux MF1B generated by a field coil 6 and the magnet-based magnetic flux MF2B generated by the second permanent magnet 32B flow out from the second iron pole portion PB2 outward in the radial direction.

On the other hand, as illustrated in part (a) of FIG. 4, in the first iron pole portion PA2 of the S-pole in the first rotor 3A, the field-based magnetic flux MF1A generated by the first field coil 6A and the magnet-based magnetic flux MF2A generated by the first permanent magnet 32A flow in toward the first iron pole portion PA2 from outside in the radial direction. Furthermore, as illustrated in part (b) of FIG. 4, in the second magnet-based magnetic pole portion PB1 of the S-pole in the second rotor 3B, the magnet-based magnetic flux MF2B generated by the second permanent magnet 32B flows in toward the second magnet-based magnetic pole portion PB1 from the outside in the radial direction.

In this manner, in the rotor 3, the magnetic flux flows from the rotor 3 side to the stator 4 side at the magnetic pole portion having the N-pole, while the magnetic flux flows from the stator 4 side to the rotor 3 side at the magnetic pole portion having the S-pole. In addition, the magnetic pole portion having the N-pole in the rotor 3 includes: the first magnet-based magnetic pole portion PA1 including the first permanent magnet 32A in the first rotor 3A; and the second iron pole portion PB2 not including the permanent magnet in the second rotor 3B. Furthermore, the magnetic pole portion having the S-pole in the rotor 3 includes: the first iron pole portion PA2 not including a permanent magnet in the first rotor 3A; and the second magnet-based magnetic pole portion PB1 including the second permanent magnet 32B in the second rotor 3B.

Therefore, in the rotor 3, both the magnetic pole portion having the N-pole and the magnetic pole portion having the S-pole, which are alternately arranged in the circumferential direction, are formed with magnet-based magnetic pole in which permanent magnets are arranged and having high magnetic flux directionality and high magnetic flux density, and with iron poles including no permanent magnets and having low magnetic flux directionality and low magnetic flux density. Therefore, it is possible, on the surface of the rotor 3, to increase the uniformity in the magnetic flux directionality and the magnetic flux density, in other words, the magnetic flux distribution and the magnetic flux amount, in the magnetic pole portion having the N-pole and the magnetic pole portion having the S-pole, making it possible to decrease the non-uniformity of the magnetic flux applied from the rotor 3 to the stator 4 so as to reduce the vibration at the time of rotor rotation due to the non-uniformity of the magnetic flux. Furthermore, increasing the uniformity of the magnetic flux amount in the magnetic pole portion having the N-pole and the magnetic pole portion having the S-pole will make it possible to reduce the loss.

Furthermore, in the rotary electric machine 1 according to the first embodiment, as illustrated in FIG. 3, the magnetic circuit (field path) through which the field-based magnetic fluxes MF1A and MF1B pass is divided into the first rotor 3A side and the second rotor 3B side in the axial direction D1. Therefore, in the rotary electric machine 1 according to the first embodiment, the amount of current flowing in the first field coil 6A and the second field coil 6B is individually adjusted, and the magnetic flux amounts of the field-based magnetic fluxes MF1A and MF1B are individually controlled. With this configuration, it is possible to increase uniformity in the magnetic flux distribution and the magnetic flux amount on the surface of the rotor 3 and decrease the non-uniformity of the magnetic flux applied from the rotor 3 to the stator 4, leading to further reduction of the vibration due to the non-uniformity of the magnetic flux. Furthermore, since the magnetic circuits (field paths) through which the field-based magnetic fluxes MF1A and MF1B pass are separated from each other, it is also possible to increase uniformity even in the magnetic flux amounts of the field-based magnetic fluxes MF1A and MF1B.

Furthermore, in the rotary electric machine 1 according to the first embodiment, the first field coil 6A and the second field coil 6B are energized to generate the field-based magnetic flux MF1A and MF1B in the high load mode, leading to a state, as illustrated in parts (a) and (b) of FIG. 4, where the field-based magnetic fluxes MF1A and MF1B respectively flow into the first iron pole portion PA2 in the first rotor core 31A and the second iron pole portion PB2 in the second rotor core 31B. Therefore, the magnet-based magnetic flux MF2A is less likely to leak from the first magnet-based magnetic pole portion PA1 to the first iron pole portion PA2 in the first rotor core 31A, while the magnet-based magnetic flux MF2B is less likely to leak from the second magnet-based magnetic pole portion PB1 to the second iron pole portion PB2 in the second rotor core 31B. This increases the magnet-based magnetic fluxes MF2A and MF2B flowing between the rotor 3 and the stator 4 increase accordingly, making it possible to effectively use the magnet-based magnetic fluxes MF2A and MF2B. Furthermore, the field-based magnetic fluxes MF1A and MF1B can increase the amount of magnetic flux flowing between the rotor 3 and the stator 4. Therefore, it is possible to achieve torque improvement in the high load mode.

Furthermore, in the rotary electric machine 1 according to the first embodiment, the first field coil 6A and the second field coil 6B are not energized, and the field-based magnetic flux MF1A and MF1B are not generated in the low load mode, leading to a state where the field-based magnetic fluxes MF1A and MF1B would not respectively flow into the first iron pole portion PA2 in the first rotor core 31A and the second iron pole portion PB2 in the second rotor core 31B. Therefore, the magnet-based magnetic flux MF2A is likely to leak from the first magnet-based magnetic pole portion PA1 to the first iron pole portion PA2 in the first rotor core 31A, while the magnet-based magnetic flux MF2B is likely to leak from the second magnet-based magnetic pole portion PB1 to the second iron pole portion PB2 in the second rotor core 31B. Therefore, the amount of magnet-based magnetic flux MF2A and MF2B short-circuited inside the first rotor core 31A and the second rotor core 31B increases, and the amount of magnet-based magnetic flux MF2A and MF2B between the rotor 3 and the stator 4 decreases, making it possible to reduce the back electromotive force. Therefore, it is possible to achieve high rotation in the low load mode.

Furthermore, the rotor 3 may have a configuration in which the first rotor 3A and the second rotor 3B are separated from each other, but the present disclosure is not limited to this. For example, it is allowable to have a configuration of the rotor 3 in which the first permanent magnet 32A is embedded on one side to form a portion corresponding to the first rotor 3A while the second permanent magnet 32B is embedded on the other side to form a portion corresponding to the second rotor 3B with the center in the axial direction D1 as a boundary in a single rotor core.

Figure 5:
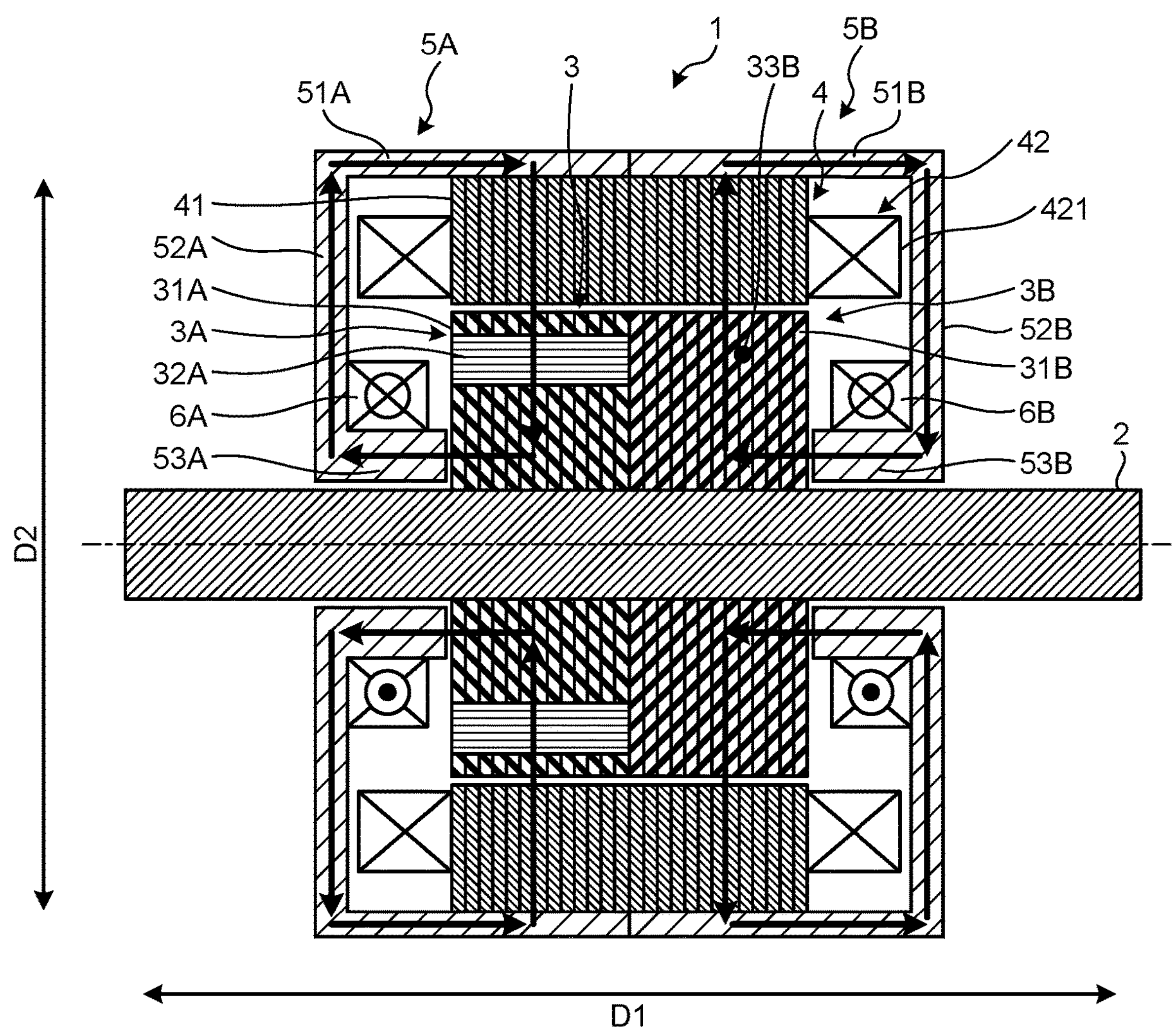
FIG. 5 is a cross-sectional view of the rotary electric machine according to the first embodiment, in which an outer wall of a field yoke is extended to be connected to an outer circumference of a stator, as viewed in a direction orthogonal to the axial direction.

In the rotary electric machine 1 according to the first embodiment, as illustrated in FIG. 5, the first outer wall 51A and the second outer wall 51B of the first field yoke 5A and the second field yoke 5B may respectively be extended to the outer periphery of the stator 4 in the radial direction D2, and the end surfaces of the first outer wall 51A and the second outer wall 51B in the axial direction D1 may be in contact with and connected to each other. Even in this case, as illustrated in FIG. 5, it is still possible to divide the field path through which the field-based magnetic fluxes MF1A and MF1B pass into the first rotor 3A side and the second rotor 3B side in the axial direction D1.

Second Embodiment

Hereinafter, a second embodiment of a rotary electric machine according to the present disclosure will be described. The description of the parts common to the rotary electric machine 1 according to the first embodiment will be appropriately omitted.

Similarly to the rotary electric machine 1 according to the first embodiment, the rotary electric machine 1 according to the second embodiment includes the rotor 3 which is a consequent pole type rotor having the first rotor 3A and the second rotor 3B as illustrated in FIG. 2. Therefore, regarding the cross section of the rotor 3 in the rotary electric machine 1 according to the second embodiment when viewed in the axial direction D1 of the first rotor 3A and the second rotor 3B, the description will assume the use of FIG. 2 for reference.

Figure 6:
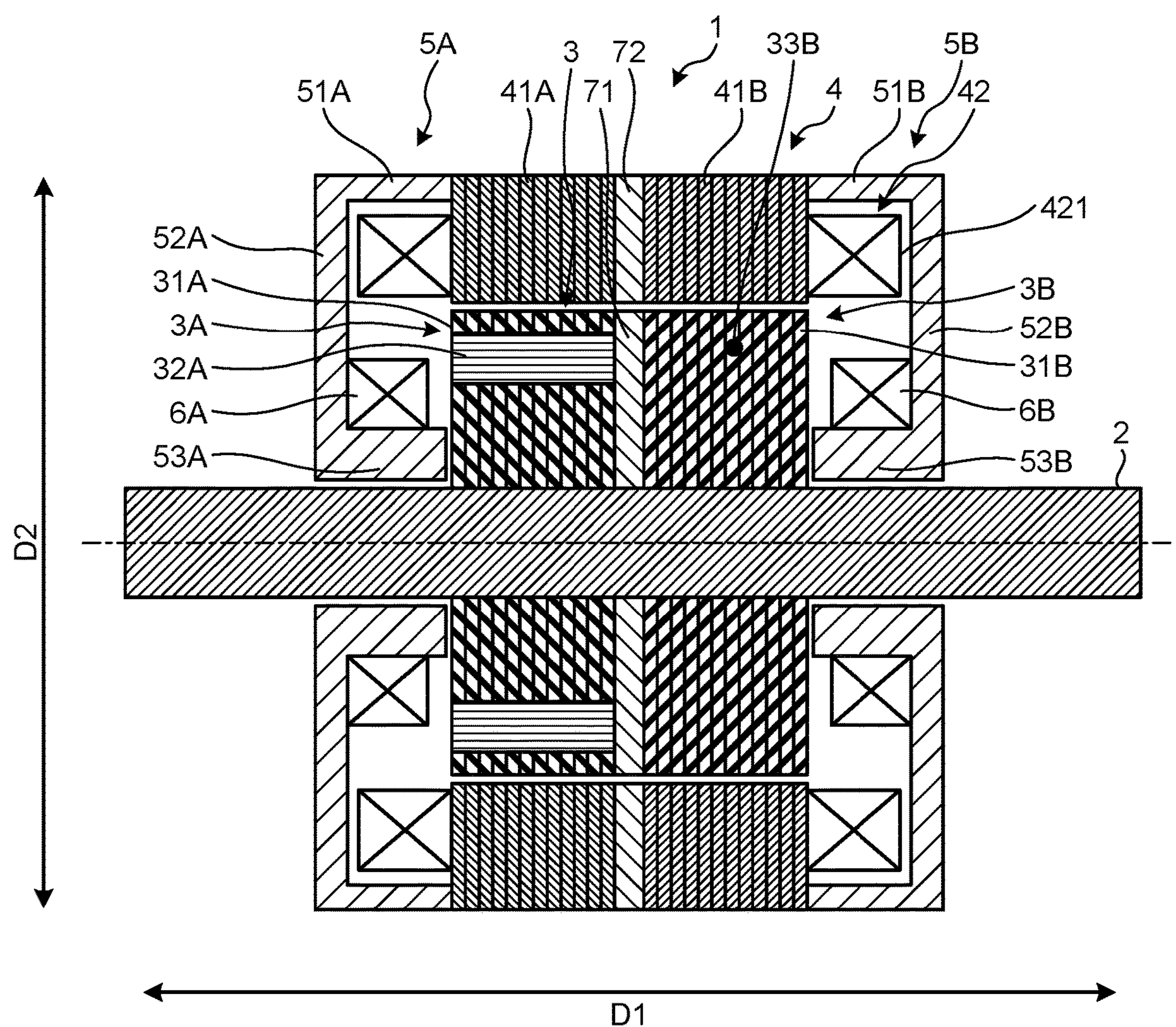
FIG. 6 is a cross-sectional view of a rotary electric machine according to a second embodiment, as viewed in the direction orthogonal to the axial direction.

FIG. 6 is a cross-sectional view of the rotary electric machine 1 according to the second embodiment, as viewed in a direction orthogonal to the axial direction D1. As illustrated in FIG. 6, the rotary electric machine 1 according to the second embodiment includes a non-magnetic member 71 having an annular shape at the center of the rotor 3 in the axial direction D1, so as to be sandwiched between the first rotor core 31A and the second rotor core 31B. That is, the rotary electric machine 1 according to the second embodiment includes the non-magnetic member 71 provided at a boundary between the first rotor core 31A and the second rotor core 31B in the axial direction D1. The non-magnetic member 71 is formed of a non-magnetic metal material or resin material, for example.

The non-magnetic member 71 has an inner diameter and an outer diameter same as those of the first rotor core 31A and the second rotor core 31B and has a length (thickness) in the axial direction D1 shorter (thinner) than the length in the first rotor core 31A and the second rotor core 31B. The non-magnetic member 71 is in contact with and secured to the first rotor core 31A and the second rotor core 31B in the axial direction D1. Furthermore, the non-magnetic member 71 is directly secured to the shaft 2 so as to be rotatable together with the shaft 2. The non-magnetic member 71 may be provided at a position slightly displaced from the center of the rotor 3 in the axial direction D1.

Furthermore, in the rotary electric machine 1 according to the second embodiment, the stator core 41 that constitutes the stator 4 is divided into two parts, that is, a first stator core 41A and a second stator core 41B in the axial direction D1. The first stator core 41A and the second stator core 41B have the same inner diameter, outer diameter, and the same length in the axial direction D1. The first stator core 41A faces the first rotor core 31A in the radial direction D2. Furthermore, the second stator core 41B faces the second rotor core 31B in the radial direction D2.

In addition, the rotary electric machine 1 according to the second embodiment includes an annular non-magnetic member 72 provided at the center of the stator 4 in the axial direction D1, so as to be sandwiched between the first stator core 41A and the second stator core 41B. That is, in the rotary electric machine 1 according to the second embodiment, the non-magnetic member 72 is provided at a boundary between the first stator core 41A and the second stator core 41B in the axial direction D1.

The non-magnetic member 72 has an inner diameter and an outer diameter same as those of the first stator core 41A and the second stator core 41B and has a length (thickness) in the axial direction D1 shorter (thinner) than the length in the first stator core 41A and the second stator core 41B. The non-magnetic member 72 is in contact with and secured to the first stator core 41A and the second stator core 41B in the axial direction D1. In addition, in the rotary electric machine 1 according to the second embodiment, the first stator core 41A and the second stator core 41B are not limited to having the same length in the axial direction D1. The non-magnetic member 72 may be provided at a position slightly displaced from the center of the stator 4 in the axial direction D1.

The non-magnetic member 72 is formed of a non-magnetic metal material or resin material, for example. In addition, the non-magnetic member 72 may be provided with a positioning unit for performing positioning with respect to at least one of the first stator core 41A or the second stator core 41B.

Figure 7:
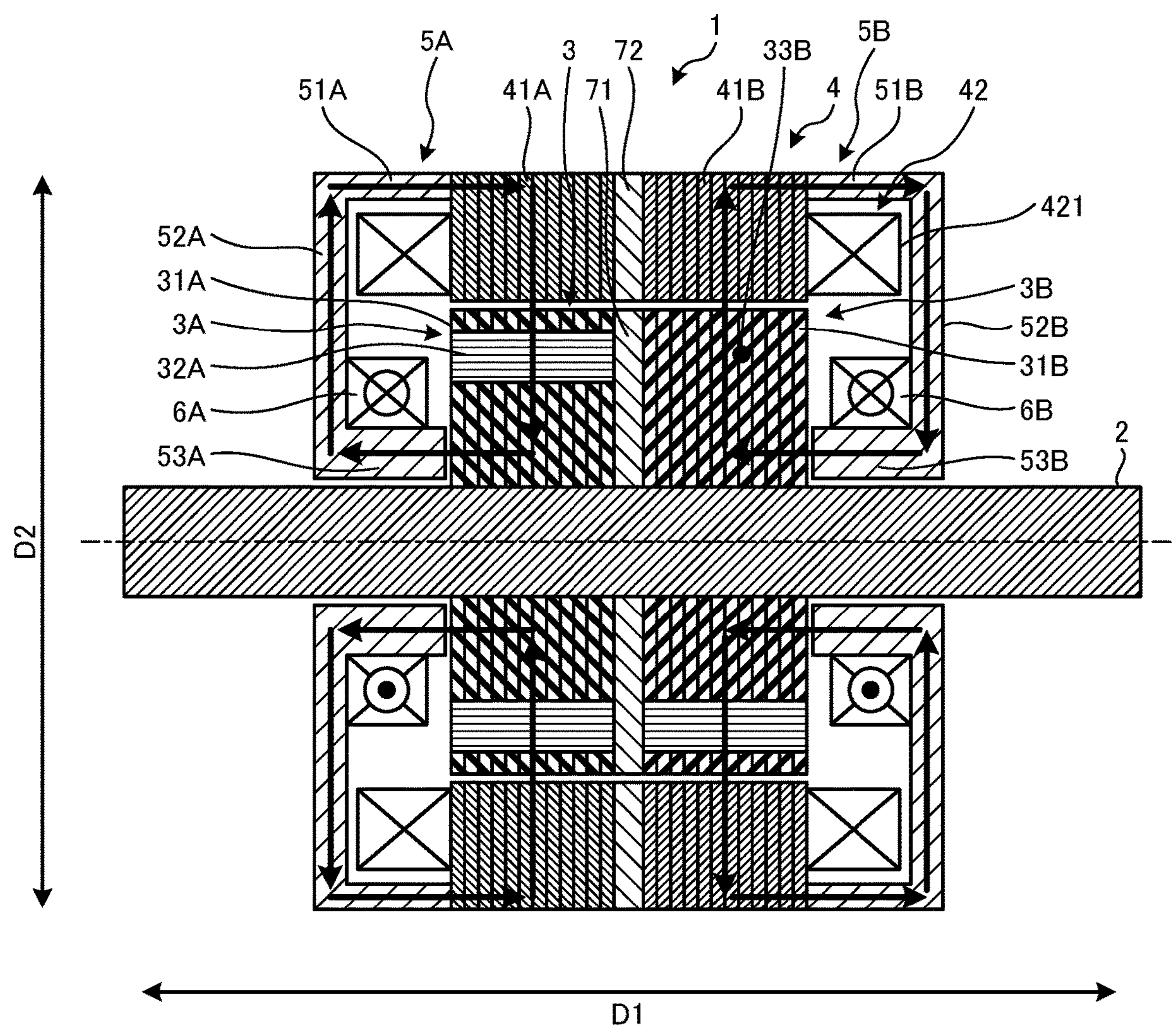
FIG. 7 is a cross-sectional view illustrating a flow of a field-based magnetic flux when the rotary electric machine according to the second embodiment is viewed in a direction orthogonal to the axial direction.

FIG. 7 is a cross-sectional view illustrating flows of field-based magnetic fluxes MF1A and MF1B, as viewed in a direction orthogonal to the axial direction D1 of the rotary electric machine 1 according to the second embodiment.

The rotary electric machine 1 according to the second embodiment includes a non-magnetic zone, which is a region including the non-magnetic member 71, so as to be provided between the first rotor core 31A and the second rotor core 31B to achieve a non-contact state between the first rotor core 31A and the second rotor core 31B. This suppresses penetration of the field-based magnetic fluxes MF1A and MF1B through the inside of the first rotor core 31A and the second rotor core 31B in the axial direction D1. That is, the field-based magnetic flux MF1A generated by the first field coil 6A is blocked by the non-magnetic member 71 from flowing from the first rotor core 31A to the second rotor core 31B in the axial direction D1. Furthermore, the field-based magnetic flux MF1B generated by the second field coil 6B is blocked by the non-magnetic member 71 from flowing from the second rotor core 31B to the first rotor core 31A in the axial direction D1.

Furthermore, the rotary electric machine 1 according to the second embodiment includes a non-magnetic zone, which is a region including the non-magnetic member 72, so as to be provided between the first stator core 41A and the second stator core 41B to achieve a non-contact state between the first stator core 41A and the second stator core 41B. This suppresses penetration of the field-based magnetic fluxes MF1A and MF1B through the inside of the first stator core 41A and the second stator core 41B in the axial direction D1. That is, the field-based magnetic flux MF1A generated by the first field coil 6A is blocked by the non-magnetic member 72 from flowing from the first stator core 41A to the second stator core 41B in the axial direction D1. Furthermore, the field-based magnetic flux MF1B generated by the second field coil 6B is blocked by the non-magnetic member 72 from flowing from the second stator core 41B to the first stator core 41A in the axial direction D1.

Therefore, in the rotary electric machine 1 according to the second embodiment, the field-based magnetic fluxes MF1A and MF1B efficiently pass through a gap formed between the rotor 3 and the stator 4, leading to torque improvement achieved by the field-based magnetic fluxes MF1A and MF1B.

Figure 8:
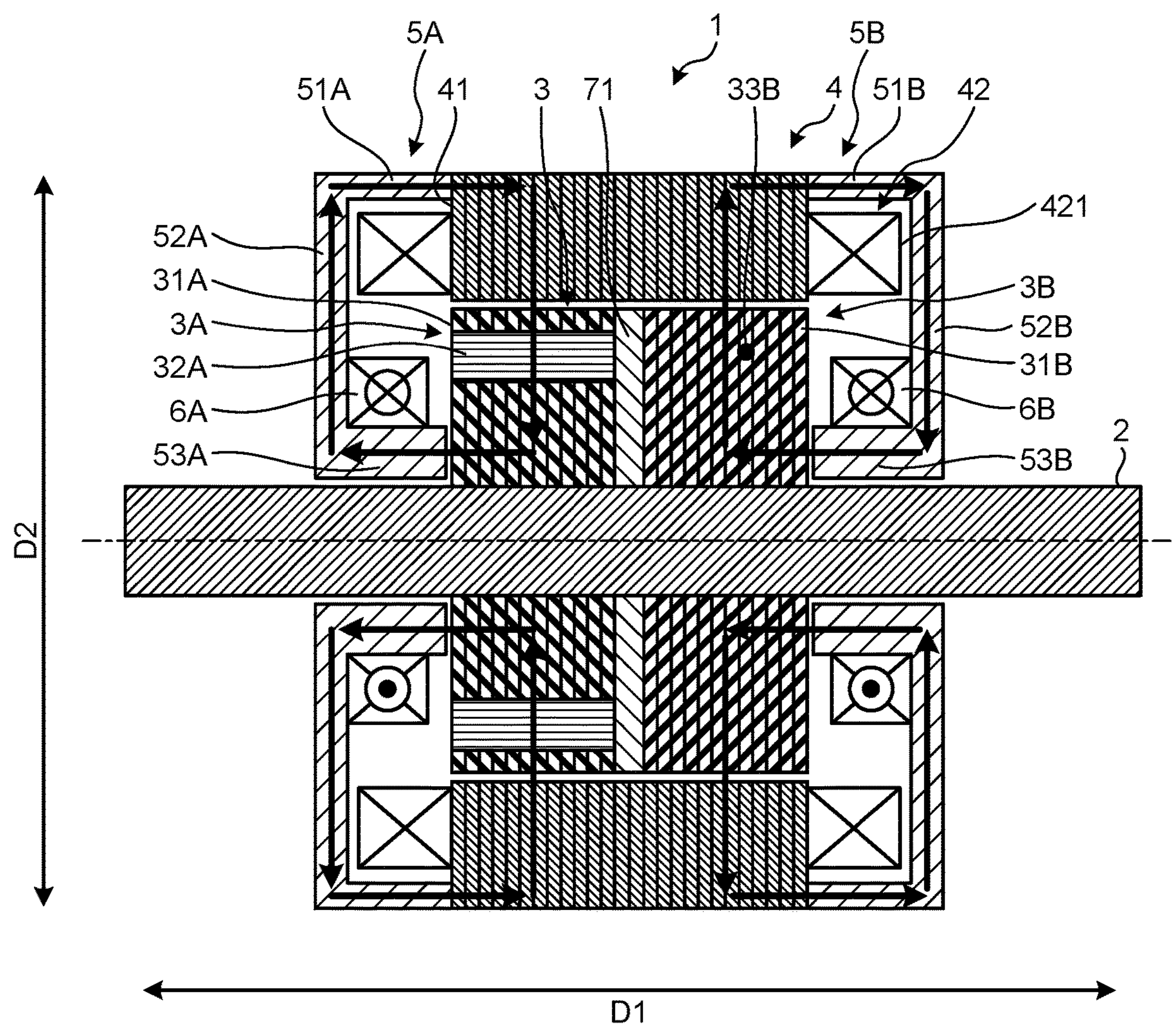
FIG. 8 is a cross-sectional view of the rotary electric machine according to the second embodiment, in which a non-magnetic member is provided only between the first rotor core and the second rotor core, as viewed in a direction orthogonal to the axial direction.
Figure 9:
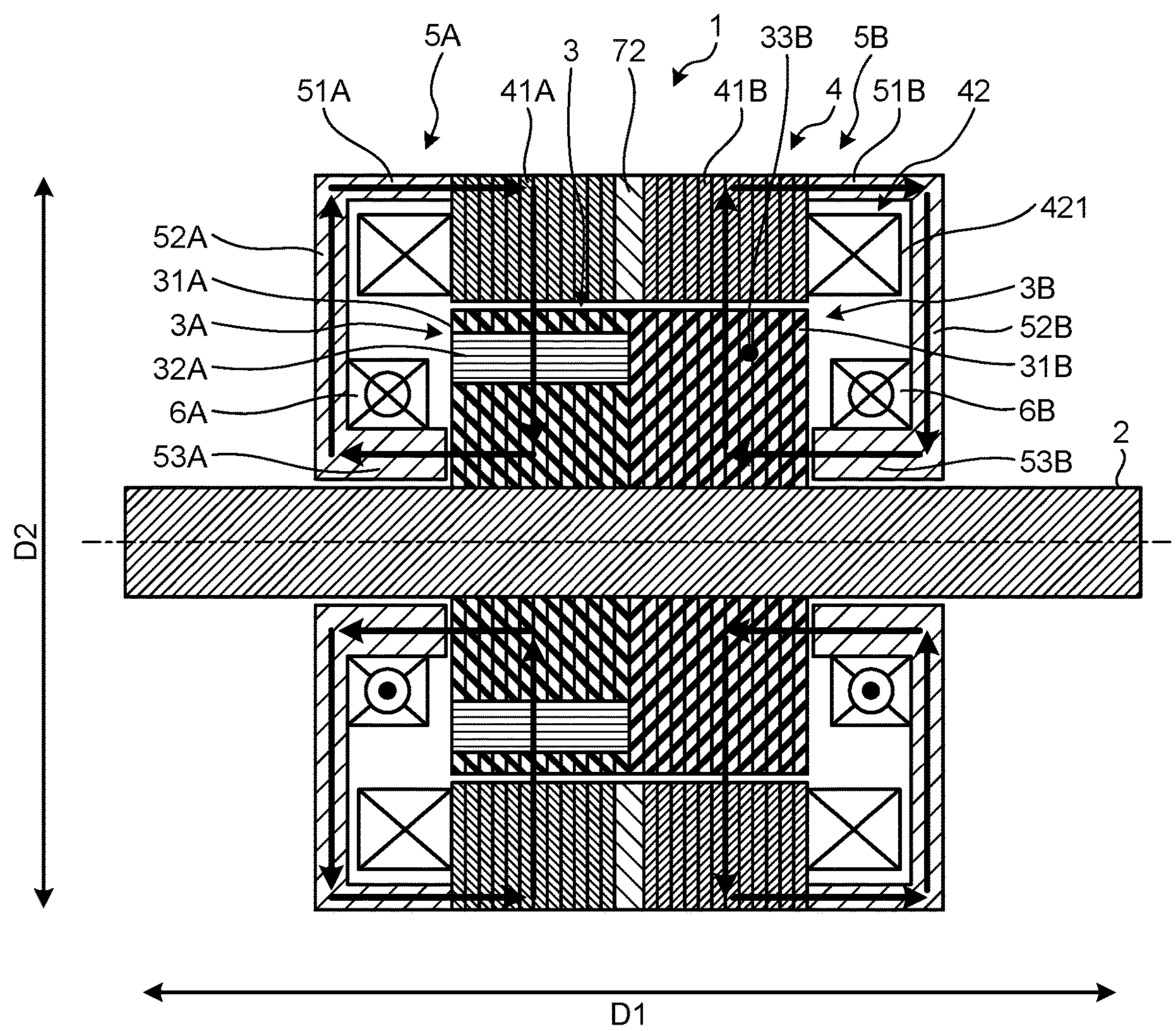
FIG. 9 is a cross-sectional view of the rotary electric machine according to the second embodiment, in which a non-magnetic member is provided only between the first stator core and the second stator core, as viewed in a direction orthogonal to the axial direction.

In the rotary electric machine 1 according to the second embodiment, it is allowable to use a configuration as illustrated in FIG. 8 in which the non-magnetic member 71 is provided between the first rotor core 31A and the second rotor core 31B, with no non-magnetic member 72 provided between the first stator core 41A and the second stator core 41B. In the rotary electric machine 1 according to the second embodiment, it is allowable to use a configuration as illustrated in FIG. 9 in which the non-magnetic member 72 is provided between the first stator core 41A and the second stator core 41B, with no non-magnetic member 71 provided between the first rotor core 31A and the second rotor core 31B.

Furthermore, in the rotary electric machine 1 according to the second embodiment, it is allowable to use a configuration in which no non-magnetic member 71 is provided between the first rotor core 31A and the second rotor core 31B of the rotor 3, and the first rotor core 31A and the second rotor core 31B are separated from each other in the axial direction D1 so as to form a gap as a non-magnetic zone between the first rotor core 31A and the second rotor core 31B. This makes it possible to suppress the passage of the field-based magnetic fluxes MF1A and MF1B respectively generated by the first field coil 6A and the second field coil 6B between the first rotor core 31A and the second rotor core 31B in the axial direction D1 by using the gap, leading to improvement of the torque by the field-based magnetic fluxes MF1 and MF2.

Furthermore, in the rotary electric machine 1 according to the second embodiment, it is allowable to use a configuration in which no non-magnetic member 72 is provided between the first stator core 41A and the second stator core 41B of the stator 4, and the first stator core 41A and the second stator core 41B are separated from each other in the axial direction D1 so as to form a gap as a non-magnetic zone between the first stator core 41A and the second stator core 41B. This makes it possible to suppress the passage of the field-based magnetic fluxes MF1A and MF1B respectively generated by the first field coil 6A and the second field coil 6B between the first stator core 41A and the second stator core 41B in the axial direction D1 by using the gap, leading to improvement of the torque by the field-based magnetic fluxes MF1 and MF2.

That is, in the rotary electric machine 1 according to the second embodiment, by providing the non-magnetic zone at least one of a portion between the first rotor core 31A and the second rotor core 31B or a portion between the first stator core 41A and the second stator core 41B, it is possible to further improve the torque by the field-based magnetic fluxes MF1A and MF1B as compared with the case where the non-magnetic zone is not provided. Incidentally, a non-magnetic zone may be intermittently provided in the radial direction D2 so as to allow a part of the first rotor core 31A and the second rotor core 31B, or a part of the first stator core 41A and the second stator core 41B, to be connected in the axial direction D1. Furthermore, the non-magnetic zone (the non-magnetic member 71, the non-magnetic member 72, or the gap) provided on at least one of the rotor 3 or the stator 4 may be provided not merely at one location in the axial direction D1 but also at a plurality of locations.

Figure 10:
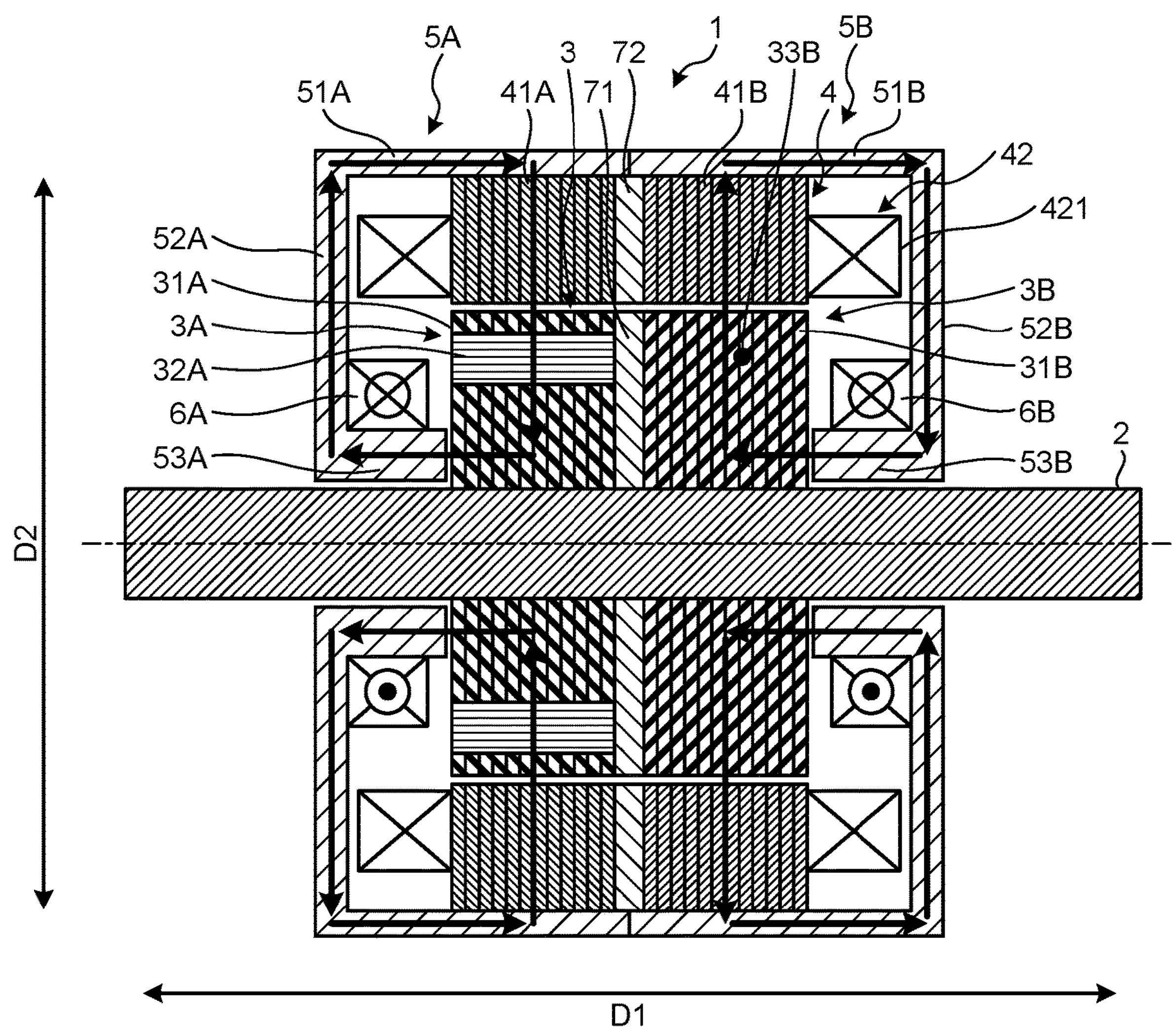
FIG. 10 is a cross-sectional view of the rotary electric machine according to the second embodiment, in which an outer wall of a field yoke is extended to be connected to an outer circumference of a stator, as viewed in a direction orthogonal to the axial direction.
Figure 11:
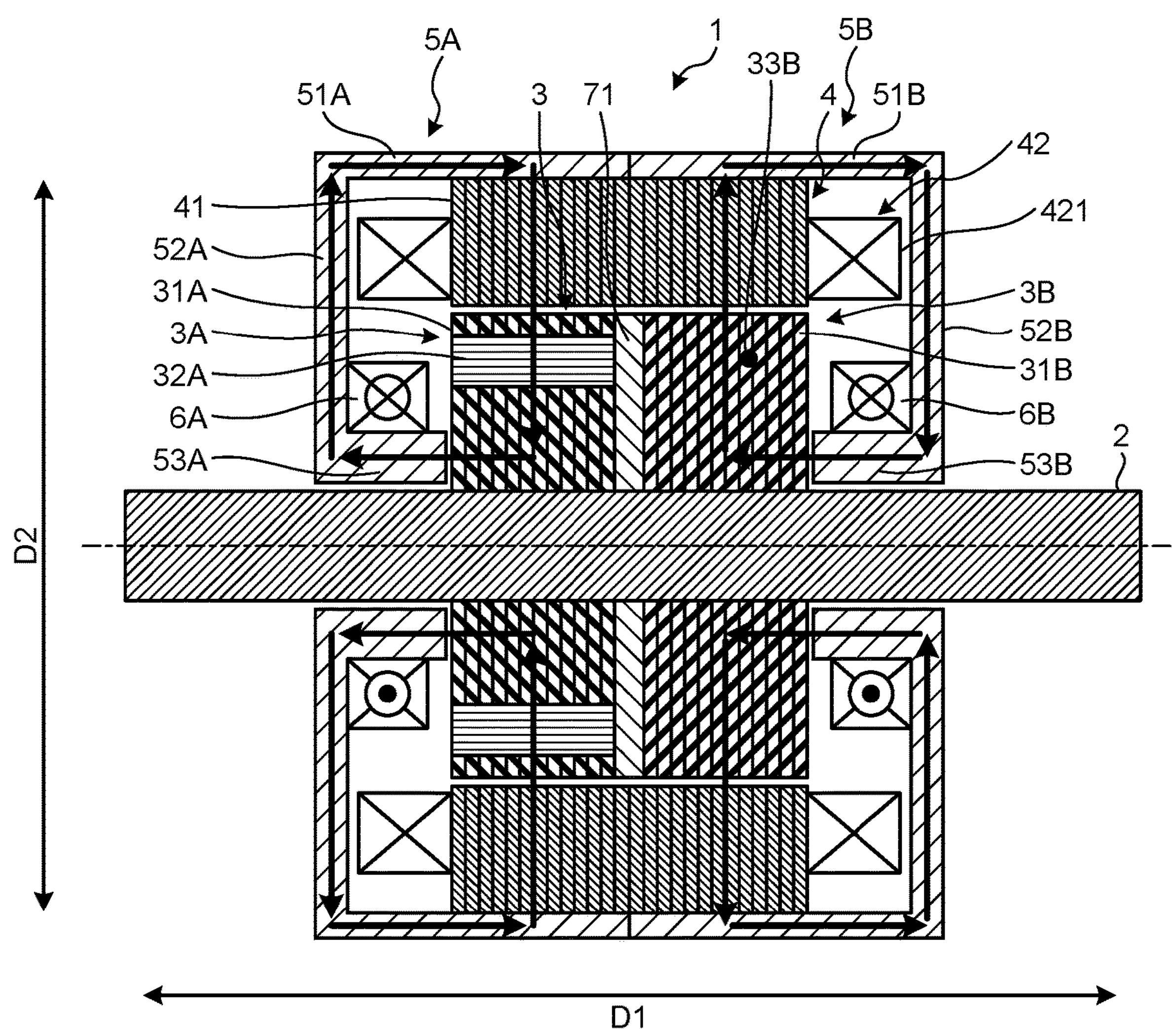
FIG. 11 is a cross-sectional view of the rotary electric machine according to the second embodiment, in which the outer wall of the field yoke is extended to be connected to the outer circumference of a stator and a non-magnetic member is provided only between the first rotor core and the second rotor core, as viewed in a direction orthogonal to the axial direction.
Figure 12:
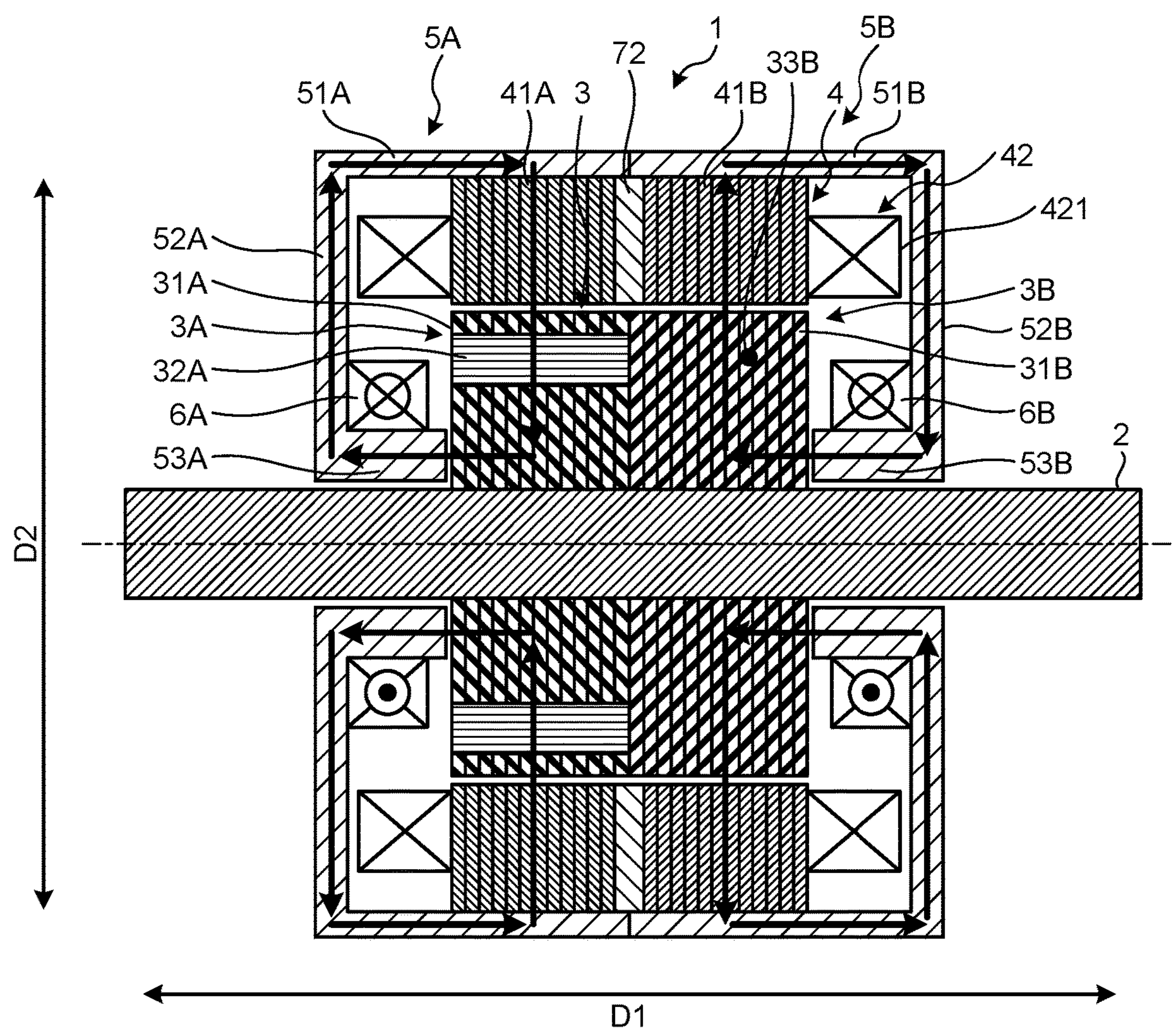
FIG. 12 is a cross-sectional view of the rotary electric machine according to the second embodiment, in which the outer wall of the field yoke is extended to be connected to the outer circumference of a stator and a non-magnetic member is provided only between the first stator core and the second stator core, as viewed in a direction orthogonal to the axial direction.

FIG. 10 is a cross-sectional view of the rotary electric machine 1 according to the second embodiment as viewed in a direction orthogonal to the axial direction, in which the first outer wall 51A and the second outer wall 51B of the first field yoke 5A and the second field yoke 5B respectively are extended to be connected to each other up to the outer circumference of the stator 4. FIG. 11 is a cross-sectional view of the rotary electric machine 1 according to the second embodiment as viewed in a direction orthogonal to the axial direction, in which the first outer wall 51A and the second outer wall 51B of the first field yoke 5A and the second field yoke 5B respectively are extended to be connected to each other up to the outer circumference of the stator 4, and the non-magnetic member 71 is provided only between the first rotor core 31A and the second rotor core 31B. FIG. 12 is a cross-sectional view of the rotary electric machine 1 according to the second embodiment viewed in a direction orthogonal to the axial direction, in which the first outer wall 51A and the second outer wall 51B of the first field yoke 5A and the second field yoke 5B respectively are extended to be connected to each other up to the outer circumference of the stator 4, and the non-magnetic member 72 is provided only between the first stator core 41A and the second stator core 41B.

Furthermore, In the rotary electric machine 1 according to the second embodiment, as illustrated in FIGS. 10, 11, and 12, the first outer wall 51A and the second outer wall 51B of the first field yoke 5A and the second field yoke 5B may respectively be extended to the outer periphery of the stator core 41 in the radial direction D2, and the end surfaces of the first outer wall 51A and the second outer wall 51B in the axial direction D1 may be in contact with and connected to each other.

Even in this case, as illustrated in FIGS. 10, 11, and 12, the field path through which the field-based magnetic fluxes MF1A and MF1B pass can be divided into a field path that passes through the first rotor core 31A and the first stator core 41A in the axial direction D1 and a field path that passes through the second rotor core 31B and the second stator core 41B. This enables the field-based magnetic fluxes MF1A and MF1B to efficiently pass through the gap formed between the rotor 3 and the stator 4.

In the rotary electric machine according to the present disclosure, the first magnet-based magnetic pole portion of the first rotor and the second iron pole portion of the second rotor, which are adjacent to each other in the axial direction, form the magnetic pole portion having the first polarity. Furthermore, the first iron pole portion of the first rotor and the second magnet-based magnetic pole portion of the second rotor, which are adjacent to each other in the axial direction, form the magnetic pole portion having the second polarity. This enables the rotary electric machine according to the present disclosure to achieve uniformity in the directionality and density of the magnetic flux, in other words, the magnetic flux distribution and the magnetic flux amount, on the rotor surface in the magnetic pole portion having the first polarity and the magnetic pole portion having the second polarity. Therefore, the rotary electric machine according to the present disclosure has an effect of reducing the vibration during rotation of the rotor due to non-uniformity in the magnetic flux.

According to an embodiment, it is possible to suppress the passage of the field-based magnetic flux generated by the field coil in the axial direction between the first rotor core and the second rotor core by using a non-magnetic member, leading to improvement of the torque by the field-based magnetic flux.

According to an embodiment, it is possible to suppress the passage of the field-based magnetic flux generated by the field coil between the first rotor core and the second rotor core in the axial direction by using a gap formed between the first rotor core and the second rotor core, leading to improvement of the torque by the field-based magnetic flux.

According to an embodiment, it is possible to suppress the passage of the field-based magnetic flux generated by the field coil in the axial direction between the first stator core and the second stator core by using the non-magnetic member, leading to improvement of the torque by the field-based magnetic flux.

According to an embodiment, it is possible to suppress the passage of the field-based magnetic flux generated by the field coil between the first stator core and the second stator core in the axial direction by using a gap formed between the first stator core and the second stator core, leading to improvement of the torque by the field-based magnetic flux.

According to an embodiment, it is possible to reduce the size of the rotary electric machine in the axial direction as compared with a case where the first rotor core and the second rotor core are separated from each other in the axial direction.

According to an embodiment, it is possible to individually adjust the amount of current flowing through the first field coil and the second field coil to individually control the magnetic flux amount regarding the field-based magnetic flux generated by the first field coil and the second field coil, leading to achieving further uniformity in the magnetic flux distribution and the magnetic flux amount on the rotor surface.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A rotary electric machine comprising:

a rotary shaft member rotatable about an axis;

a first rotor including a first rotor core having an annular shape secured to the rotary shaft member, a plurality of first permanent magnets having a first polarity being embedded in the first rotor core, the first rotor having a configuration in which a first magnet-based magnetic pole portion having the first polarity and formed by the first permanent magnets, and a first iron core portion having a second polarity different from the first polarity and formed by an iron pole portion of the first rotor core without having the first permanent magnet, are alternately arranged in a circumferential direction of the first rotor core;

a second rotor including a second rotor core having an annular shape secured to the rotary shaft member, a plurality of second permanent magnets having the second polarity being embedded in the second rotor core, the second rotor having a configuration in which a second magnet-based magnetic pole portion having the second polarity and formed by the second permanent magnets, and a second iron core portion having the first polarity and formed by an iron pole portion of the second rotor core without having the second permanent magnet, are alternately arranged in a circumferential direction of the second rotor core;

a stator including a stator core having an annular shape arranged at an interval in a radial direction orthogonal to an axial direction of the rotary shaft member and including a stator coil provided in the stator core, provided with respect to the first rotor and the second rotor; and a field yoke arranged outside of the first rotor, the second rotor, and the stator, in the axial direction, and including a field coil that is energized to generate a field-based magnetic flux, wherein the first rotor and the second rotor are arranged on the rotary shaft member, in a state where the first magnet-based magnetic pole portion and the second iron pole portion are in contact with and connected to each other in the axial direction while the first iron pole portion and the second magnet-based magnetic pole portion are in contact with and connected to each other in the axial direction.

2. The rotary electric machine according to claim 1, wherein the stator core includes: a first stator core provided on one side in the axial direction and a second stator core provided on another side in the axial direction, and a non-magnetic member is provided between the first stator core and the second stator core in the axial direction.

3. The rotary electric machine according to claim 1, wherein the stator core includes: a first stator core provided on one side in the axial direction and a second stator core provided on another side in the axial direction, and the first stator core and the second stator core are separated from each other in the axial direction.

4. The rotary electric machine according to claim 1, wherein the field yoke includes: a first field yoke arranged outside of the first rotor and the stator on one side of the axial direction; and a second field yoke arranged outside the second rotor and the stator on another side of the axial direction, and the field coil includes: a first field coil that is provided on the first field yoke to form a magnetic circuit between the first field yoke, the first rotor, and the stator; and a second field coil provided on the second field yoke to form a magnetic circuit between the second field yoke, the second rotor, and the stator.

* * * * *